United States Patent
Giffel

(10) Patent No.: US 9,448,706 B2
(45) Date of Patent: Sep. 20, 2016

(54) LOOP REMOVAL IN ELECTRONIC DESIGN AUTOMATION

(75) Inventor: Barry A. Giffel, Wake Forest, NC (US)

(73) Assignee: SYNOPSYS, INC., Mountain View, CA (US)

(*) Notice: Subject to any disclaimer, the term of this patent is extended or adjusted under 35 U.S.C. 154(b) by 643 days.

(21) Appl. No.: 12/582,264

(22) Filed: Oct. 20, 2009

(65) Prior Publication Data

US 2011/0025705 A1 Feb. 3, 2011

Related U.S. Application Data

(60) Provisional application No. 61/229,461, filed on Jul. 29, 2009.

(51) Int. Cl.
*G09G 5/00* (2006.01)
*G06F 3/0484* (2013.01)

(52) U.S. Cl.
CPC ................. *G06F 3/04845* (2013.01)

(58) Field of Classification Search
None
See application file for complete search history.

(56) References Cited

U.S. PATENT DOCUMENTS

| | | | | |
|---|---|---|---|---|
| 4,686,522 A * | 8/1987 | Hernandez | G06F 3/0481 345/160 |
| 5,867,172 A * | 2/1999 | Fujisawa et al. | 345/467 |
| 6,535,213 B1 * | 3/2003 | Ogino et al. | 345/442 |
| 6,718,293 B1 * | 4/2004 | Ha et al. | 703/13 |
| 6,816,170 B1 * | 11/2004 | Udeshi | G06T 3/403 345/472 |
| 7,256,388 B2 * | 8/2007 | Eglington et al. | 250/221 |
| 7,320,119 B2 * | 1/2008 | Melvin et al. | 716/52 |
| 7,463,258 B1 * | 12/2008 | Drury et al. | 345/423 |
| 8,036,433 B1 * | 10/2011 | Wolff | 382/119 |
| 2001/0033289 A1 * | 10/2001 | Graham | 345/619 |
| 2002/0181796 A1 * | 12/2002 | Yoshizawa | 382/256 |
| 2004/0172149 A1 * | 9/2004 | Eto | 700/95 |
| 2006/0248499 A1 * | 11/2006 | Sezginer et al. | 716/21 |
| 2006/0265677 A1 * | 11/2006 | Scheffer et al. | 716/5 |
| 2007/0038955 A1 * | 2/2007 | Nguyen | 715/804 |
| 2007/0109310 A1 * | 5/2007 | Xu | G06T 15/02 345/581 |
| 2008/0259078 A1 * | 10/2008 | Dokken et al. | 345/423 |
| 2009/0027396 A1 * | 1/2009 | Frisken | 345/442 |
| 2009/0136136 A1 * | 5/2009 | Mori et al. | 382/187 |
| 2009/0245645 A1 * | 10/2009 | Xing | 382/189 |
| 2009/0307639 A1 * | 12/2009 | Chapman et al. | 716/4 |
| 2010/0185996 A1 * | 7/2010 | El Yahyaoui et al. | 716/10 |
| 2010/0265255 A1 * | 10/2010 | Iwamoto | 345/442 |

* cited by examiner

*Primary Examiner* — Anh-Tuan V Nguyen
(74) *Attorney, Agent, or Firm* — Park, Vaughan, Fleming & Dowler LLP; Laxman Sahasrabuddhe

(57) ABSTRACT

Some embodiments provide a system that facilitates graphical object creation in an electronic design automation (EDA) application. During operation, the system uses a cursor to obtain a sequence of points from a user for creating a graphical object in a layout. Next, the system detects a loop in the graphical object based at least on the sequence of points and a current position of the cursor. Finally, the system modifies the sequence of points to remove the loop from the graphical object.

18 Claims, 6 Drawing Sheets

LOOP REMOVAL IN ELECTRONIC DESIGN AUTOMATION

RELATED APPLICATIONS

This application claims priority to U.S. Provisional Application No. 61/229,461, entitled "Self Intersecting Loop Removal," by Barry Andrew Giffel, filed 29 Jul. 2009, the contents of which are herein incorporated by reference.

BACKGROUND

1. Technical Field

This disclosure relates to electronic design automation (EDA). More specifically, this disclosure relates to a method and system for removing loops in EDA layouts.

2. Related Art

Electronic design automation (EDA) tools for producing layouts typically include mechanisms for placing circuit cells and other elements on an integrated circuit floor plan, as well as mechanisms for routing interconnections between the elements of the integrated circuit. Within a layout, geometric objects such as polygons may represent integrated circuit elements, while paths between the geometric objects may represent wires that electrically couple the integrated circuit elements. To create the layout, a user may interact with a graphical user interface (GUI) for an EDA application and/or use an EDA tool. For example, the user may draw and position some of the geometric objects and paths in the layout using a cursor (e.g., a mouse pointer) provided by the GUI, while other geometric objects and paths may be automatically created in the layout by a place-and-route tool and/or a schematic-driven-layout tool.

However, drawing mechanisms associated with layout creation may introduce errors and/or inefficiencies in the design of integrated circuits. In particular, loops may be undesirable in the drawing of both polygons and paths in a layout. For example, loops may cause polygons to be self-intersecting and may introduce additional overhead in the handling of integrated circuit elements by EDA tools. Similarly, loops in wires may require removal during verification of the layout to prevent problems associated with the manufacturing of integrated circuits based on the layout.

SUMMARY

Some embodiments provide a system that facilitates graphical object creation in an electronic design automation (EDA) application. During operation, the system uses a cursor (e.g., a mouse pointer) to obtain a sequence of points from a user for creating a graphical object in a layout. For example, the graphical object can be associated with a path or a polygon. Next, the system detects a loop in the graphical object based at least on the sequence of points and a current position of the cursor. Finally, the system modifies the sequence of points to remove the loop from the graphical object. The system may append the current position of the cursor to the sequence of points. Alternatively, the system may keep track of the current position of the cursor separately, i.e., not as part of the sequence of points.

In some embodiments, detecting the loop in the graphical object involves determining a line segment between the current position of the cursor and the last point in the sequence of points, and determining whether the line segment intersects with another line segment between any two consecutive points in the sequence of points. Specifically, in some embodiments, the system can examine, in order, line segments between consecutive points in the sequence of points for intersection with the line segment between the current position of the cursor and the last point in the sequence of points.

Once the system identifies the earliest two consecutive points in the sequence of points such that the line segment between the two consecutive points intersects with the line segment between the current position of the cursor and the last point in the sequence of points, the system can modify the sequence of points to remove the loop. Specifically, the system can remove, from the sequence of points, points added after the earlier of the two consecutive points. Next, the system can append the intersection point to the sequence of points. Further, in some embodiments, the system can add the current position of the cursor to the sequence of points. The system can also remove the loop from a visual representation of the graphical object on a display screen.

In some embodiments, the sequence of points is modified prior to obtaining a new point for inclusion in the sequence of points from the user. Specifically, as the user moves the cursor on the GUI, the system can automatically detect and remove loops without waiting for the user to indicate the location of the next point. In other embodiments, the system can wait for the user to indicate the location of the next point and then detect and remove loops.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section may be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
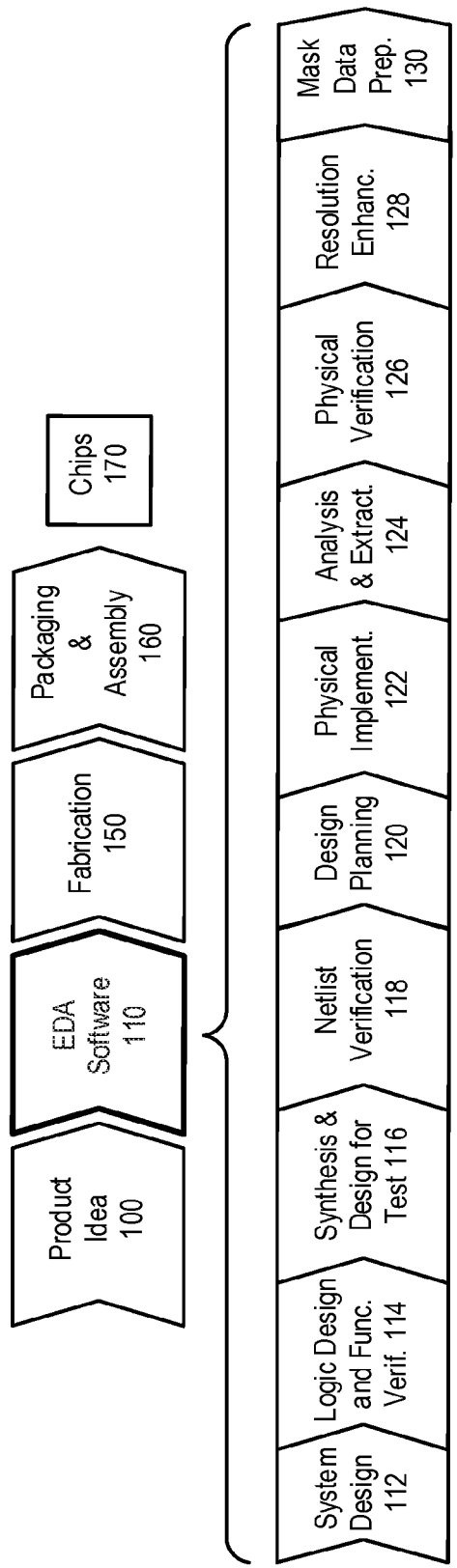
FIG. 1 shows a workflow associated with the design and fabrication of an integrated circuit in accordance with an embodiment.

FIG. 1 shows a workflow associated with the design and fabrication of an integrated circuit in accordance with an embodiment. The workflow may begin with a product idea (step 100), which may be realized using an integrated circuit that is designed using an electronic design automation (EDA) process (step 110). After the integrated circuit design is finalized, the design may undergo a fabrication process (step 150) and a packaging and assembly process (step 160) to produce chips 170.

The EDA process (step 110) includes steps 112-130, which are described below for illustrative purposes only and are not meant to limit the present invention. Specifically, the steps may be performed in a different sequence than the sequence described below.

During system design (step 112), circuit designers may describe the functionality to be implemented in the integrated circuit. They may also perform what-if planning to refine functionality, check costs, etc. Hardware-software architecture partitioning may also occur at this stage. Exemplary EDA software products from Synopsys, Inc. that may be used at this step include Model Architect, Saber®, System Studio, and DesignWare®.

During logic design and functional verification (step 114), the VHDL or Verilog code for modules in the system may be written and the design may be checked for functional accuracy, (e.g., the design may be checked to ensure that it produces the correct outputs). Exemplary EDA software products from Synopsys, Inc. that may be used at this step include VCS®, Vera®, DesignWare®, Magellan™, Formality®, ESP and Leda®.

During synthesis and design for test (step 116), the VHDL/Verilog may be translated to a netlist. Further, the netlist may be optimized for the target technology, and tests may be designed and implemented to check the finished chips. Exemplary EDA software products from Synopsys, Inc. that may be used at this step include Design Compiler®, Physical Compiler®, Test Compiler, Power Compiler™, FPGA Compiler, TetraMAX®, and DesignWare®.

During netlist verification (step 118), the netlist may be checked for compliance with timing constraints and for correspondence with the VHDL/Verilog source code. Exemplary EDA software products from Synopsys, Inc. that may be used at this step include Formality®, PrimeTime®, and VCS®.

During design planning (step 120), an overall floorplan for the chip may be constructed and analyzed for timing and top-level routing. Exemplary EDA software products from Synopsys, Inc. that may be used at this step include Astro™ and IC Compiler products.

During physical implementation (step 122), circuit elements may be positioned in the layout (placement) and may be electrically coupled (routing). Exemplary EDA software products from Synopsys, Inc. that may be used at this step include Astro™ and IC Compiler products.

During analysis and extraction (step 124), the circuit's functionality may be verified at a transistor level and parasitics may be extracted. Exemplary EDA software products from Synopsys, Inc. that may be used at this step include AstroRail™, PrimeRail, PrimeTime®, and Star-RCXTT™.

During physical verification (step 126), the design may be checked to ensure correctness for manufacturing, electrical issues, lithographic issues, and circuitry. Hercules™ is an exemplary EDA software product from Synopsys, Inc. that may be used at this step.

During resolution enhancement (step 128), geometric manipulations may be performed on the layout to improve manufacturability of the design. Exemplary EDA software products from Synopsys, Inc. that may be used at this step include Proteus/ProGen, ProteusAF, and PSMGen.

During mask data preparation (step 130), the design may be "taped-out" to produce masks that are used during fabrication.

Figure 2:
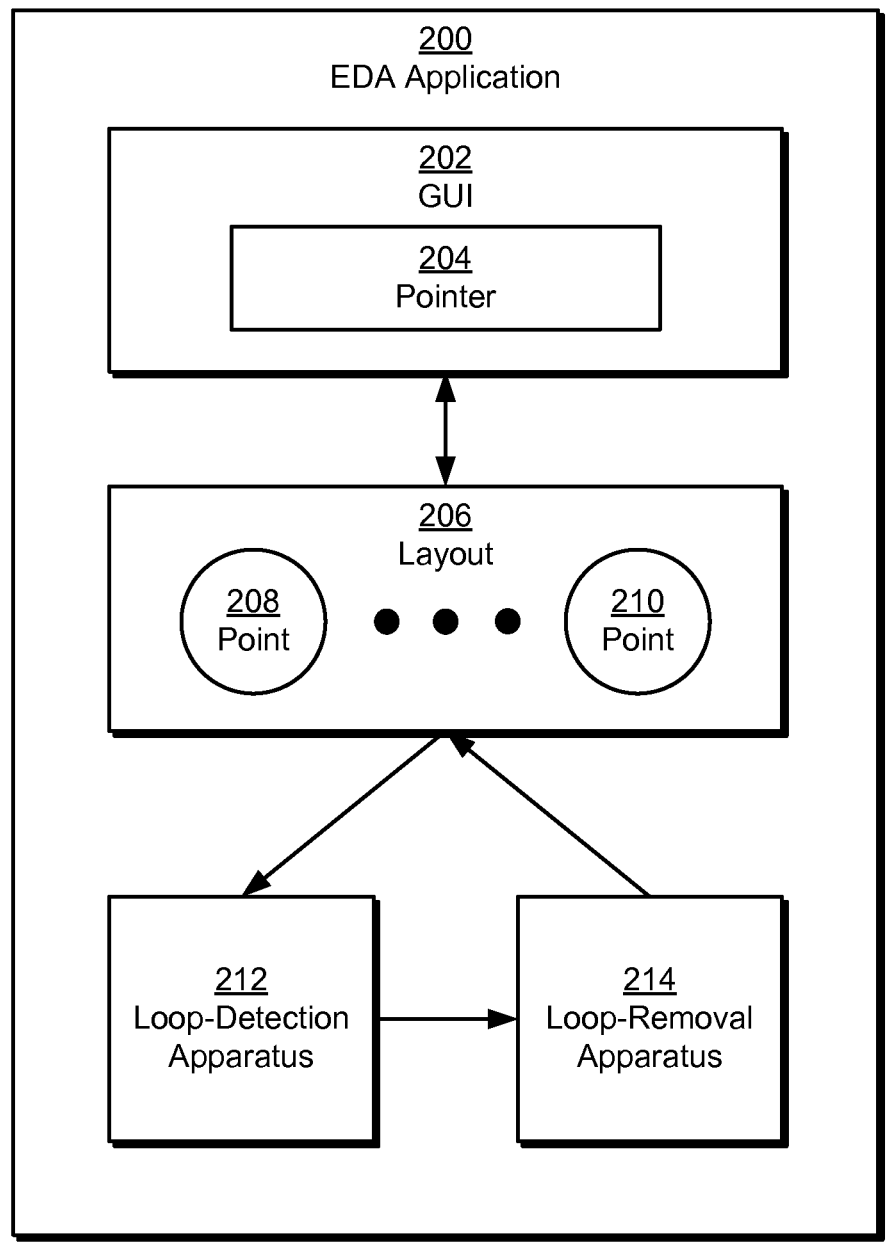
FIG. 2 shows an electronic design automation (EDA) application in accordance with an embodiment.

FIG. 2 shows an EDA application 200 in accordance with an embodiment. As shown in FIG. 2, EDA application 200 includes a graphical user interface (GUI) 202, a layout 206, a loop-detection apparatus 212, and a loop-removal apparatus 214. Each of these components is described in further detail below.

Layout 206 may correspond to a representation of an integrated circuit that uses graphical objects to represent patterns of metal, oxide, and/or semiconductor layers that make up the integrated circuit. Such graphical objects may include polygons that represent integrated circuit elements (e.g., transistors, resistors, capacitors, etc.) and paths representing wires that electrically couple the integrated circuit elements. Furthermore, a graphical object in layout 206 may be created by using a sequence of points 208-210 in layout 206.

In particular, points 208-210 may represent vertices in a polygon, with pairs of consecutive points in the sequence defining the edges of the polygon. For example, a sequence of five points may represent a quadrilateral if the first and fifth points contain the same value (e.g., coordinates). Edges of the quadrilateral may thus be drawn between the first and second points, the second and third points, the third and fourth points, and the fourth and fifth points. On the other hand, points 208-210 may specify a path in layout 206, with pairs of consecutive points in the sequence defining straight line segments that connect to form the path. For example, an L-shaped path may be denoted by three points and drawn by connecting the first and second points and the second and third points with two line segments.

In one or more embodiments, EDA application 200 is used to create layout 206. For example, EDA application 200 may include an integrated-circuit-layout editor, a place-and-route tool, and/or a schematic-driven-layout tool. To create layout 206, a user of EDA application 200 may create a graphical object by providing the sequence of points 208-210 representing the graphical object to EDA application 200.

In one or more embodiments, the user specifies points 208-210 within EDA application 200 using a cursor 204 provided by GUI 202. Cursor 204 may correspond to a symbol (e.g., an arrow symbol or a hand symbol) appearing in GUI 202 that allows the user to provide graphical input to EDA application 200. For example, the user may draw paths and/or polygons in layout 206 by moving cursor 204 using a pointing device (e.g., mouse) and selecting locations in GUI 202 corresponding to the positions of points 208-210. Alternatively, the graphical input may be based on tactile input provided by a user through a touch screen. GUI 202 may then store the coordinates (e.g., x-coordinate, y-coordinate) of each selected location as a point 208-210 in the sequence. Using cursor 204 to create graphical objects by selecting points 208-210 within GUI 202 is discussed in further detail below with respect to FIG. 3A.

Those skilled in the art will appreciate that the existence of loops in graphical objects within layout 206 may complicate the creation of integrated circuits from layout 206. Loops in polygons may cause the polygons to be self-intersecting and may increase the overhead associated with the handling of polygons by EDA application 200. Furthermore, loops in paths representing wires may require removal during verification of layout 206 to prevent issues with the manufacturing of the integrated circuits from layout 206.

To mitigate issues associated with loops in layout 206, EDA application 200 may include functionality to detect and remove loops during creation of layout 206. In particular, loop-detection apparatus 212 may detect a loop in a graphical object as the user draws the graphical object by analyzing the sequence of points 208-210 representing the graphical object and the current position of cursor 204. GUI 202 may allow loop-detection apparatus 212 to access the current position of cursor 204 by appending the current position of cursor 204 to the sequence of points 208-210.

Loop-detection apparatus 212 may then determine if a line segment between the last point 210 in the sequence and the current position of cursor 204 intersects with another line segment between two other consecutive points in the sequence. Note that the line segment between the last point 210 in the sequence and the current position of cursor 204 may intersect with multiple line segments between two consecutive points in the sequence of points. Loop-detection apparatus 212 may detect the earliest instance of an intersection by examining, in order, line segments between consecutive points in the sequence for intersection with the first line segment between point 210 and the current position of cursor 204. For example, if the sequence contained four points, loop-detection apparatus 212 may examine the line segment between the first and second points, then the line segment between the second and third points, and finally the line segment between the third and fourth points for intersection with the line segment between the fourth point and the current position of cursor 204.

If a loop is detected, loop-removal apparatus 214 may modify the sequence of points 208-210 to remove the loop from the graphical object. In one or more embodiments, loop-removal apparatus 214 modifies points 208-210 by removing points added after the earlier of the two consecutive points defining the earliest line segment that intersects with the first line segment. Loop-removal apparatus 214 may then append the intersection point to the sequence and append the current position of the cursor to the sequence after the intersection point. In other words, loop-removal apparatus 214 may remove points representing the loop from the sequence, which in effect removes the loop from the graphical object. GUI 202 may then remove the loop from a visual representation of the graphical object that is displayed to the user (e.g., through a display screen). Modifying points to remove loops in graphical objects is discussed in further detail below with respect to FIG. 3B.

Those skilled in the art will appreciate that the functionality of loop-detection apparatus 212 and loop-removal apparatus 214 may be implemented in a variety of ways. For example, loop-detection apparatus 212 and loop-removal apparatus 214 may be provided by the same module within EDA application 200, or loop-detection apparatus 212 and loop-removal apparatus 214 may execute as separate modules from one another and/or as separate applications from EDA application 202. Moreover, loop-detection apparatus 212 and loop-removal apparatus 214 may detect and remove loops in graphical objects at various times during the creation of layout 206. For example, loop-detection apparatus 212 and loop-removal apparatus 214 may detect and remove a loop in a graphical object prior to obtaining a new point for inclusion in the sequence of points 208-210 from the user. On the other hand, the operation of loop-detection apparatus 212 and loop-removal apparatus 214 may be triggered by the selection of a new point for inclusion in the sequence to ensure that the new point does not form a loop in the graphical object. Finally, loop-detection apparatus 212 and/or loop-removal apparatus 214 may be enabled or disabled within EDA application 200 based on the user's preferences.

Figure 3A:
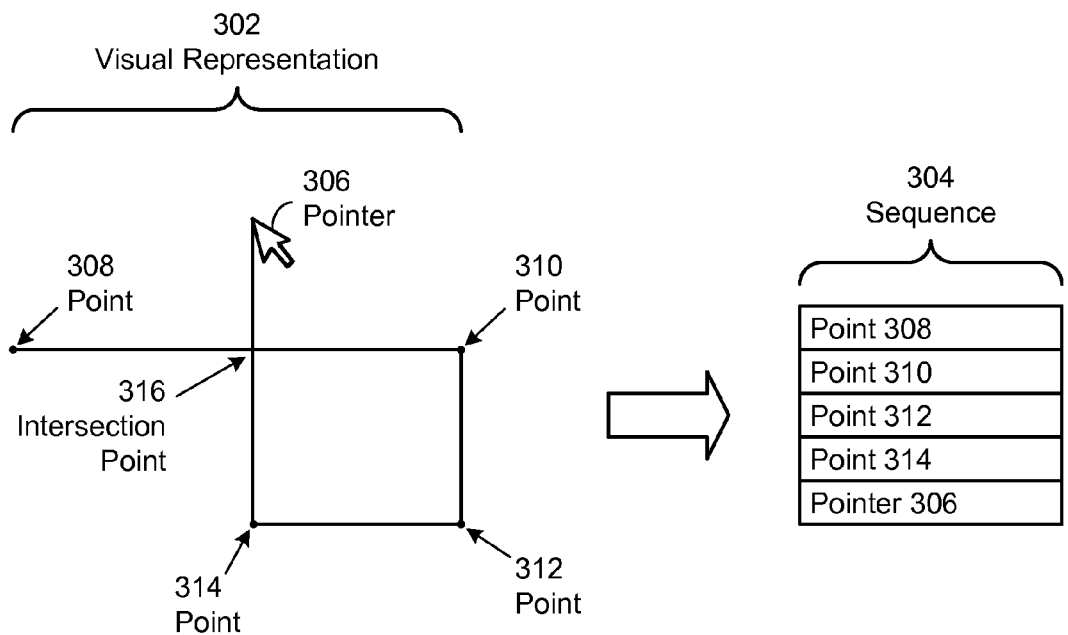
FIG. 3A shows an exemplary graphical object in accordance with an embodiment.

FIG. 3A shows an exemplary graphical object in accordance with an embodiment. More specifically, FIG. 3A shows a visual representation 302 of the graphical object and a sequence 304 of points associated with the graphical object. As described above, the graphical object may correspond to a polygon or a path in a layout, such as layout 206 of FIG. 2. The graphical object may be defined by sequence 304, which contains points 308-314 selected by a cursor 306 in a particular order. Visual representation 302 may be drawn by connecting pairs of points 308-314 in sequence 304 with line segments in the order in which points 308-314 were selected. As shown in FIG. 3A, point 308 is the first point in sequence 304, point 310 is the second point, point 312 is the third point, and point 314 is the last point in sequence 304. Consequently, line segments are drawn between points 308-310, points 310-312, and points 312-314 in visual representation 302. In addition, a line segment is drawn between point 314 and cursor 306 to represent the next potential line segment in the graphical object.

As mentioned previously, loops in the graphical object may be detected and removed as the graphical object is drawn. To detect a loop, the current position of cursor 306 may be appended to sequence 304 and analyzed along with points 308-314 for intersecting line segments in the graphical object. Particularly, a first line segment between point 314 and cursor 306 may be determined. Line segments between consecutive points in sequence 304 may then be examined from beginning to end for intersection with the first line segment. For example, line segments between points 308-310, points 310-312, and points 312-314 may be examined, in order, for intersection with the first line segment until an intersection is found or all line segments between points 308-314 have been examined. Alternatively, intersecting line segments in the graphical object may be determined using other techniques, such as a sweep line technique.

Because an intersection point 316 exists between the first line segment and a second line segment between points 308-310, a loop is found in the graphical object. To prevent errors and inefficiencies associated with processing the layout, the loop may be removed as the graphical object is drawn using cursor 306. For example, the loop may be removed after cursor 306 remains in a position that creates a loop in the graphical object beyond a specified period, or the loop may be removed after a new point in sequence 304 is selected using cursor 306.

Figure 3B:
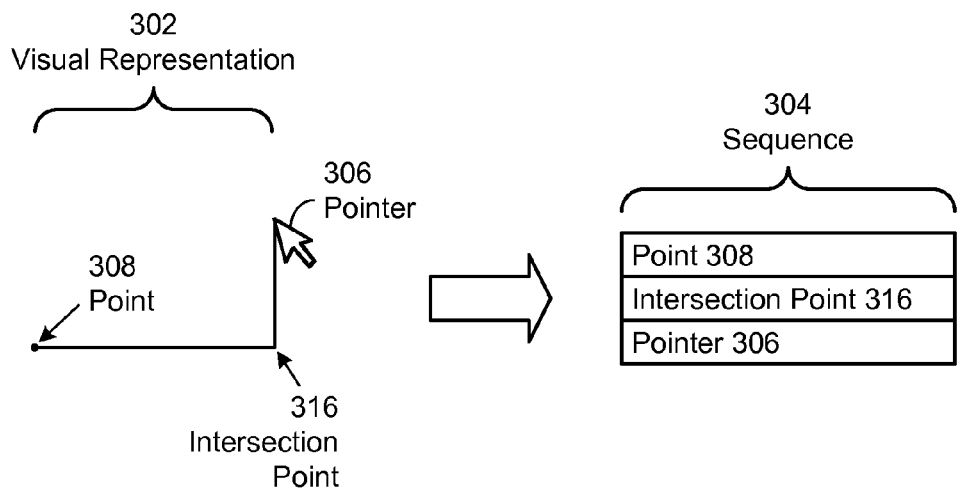
FIG. 3B shows an exemplary graphical object in accordance with an embodiment.

FIG. 3B shows an exemplary graphical object in accordance with an embodiment. More specifically, FIG. 3B shows visual representation 302 and sequence 304 after the loop is removed from the graphical object of FIG. 3A. To remove the loop, points in sequence 304 after the earlier of the two consecutive points 308-310 (e.g., point 308) defining the line segment that intersects with the first line segment are deleted from sequence 304. In other words, points that form the loop are removed from sequence 304 to effectively remove the loop from the graphical object. Next, intersection point 316 and the current position of cursor 306 are appended to the shortened sequence 304 to form a new representation of the graphical object without the loop.

Visual representation 302 is also updated using the new sequence 304 of points. As shown in FIG. 3B, visual representation 302 includes a line segment from point 308 to intersection point 316, and another line segment from intersection point 316 to cursor 306. The graphical object may continue to be drawn by adding points to sequence 304 using cursor 306. Furthermore, loops that are subsequently created in the graphical object may be detected and removed in the same manner as the loop in FIG. 3A.

Figure 4:
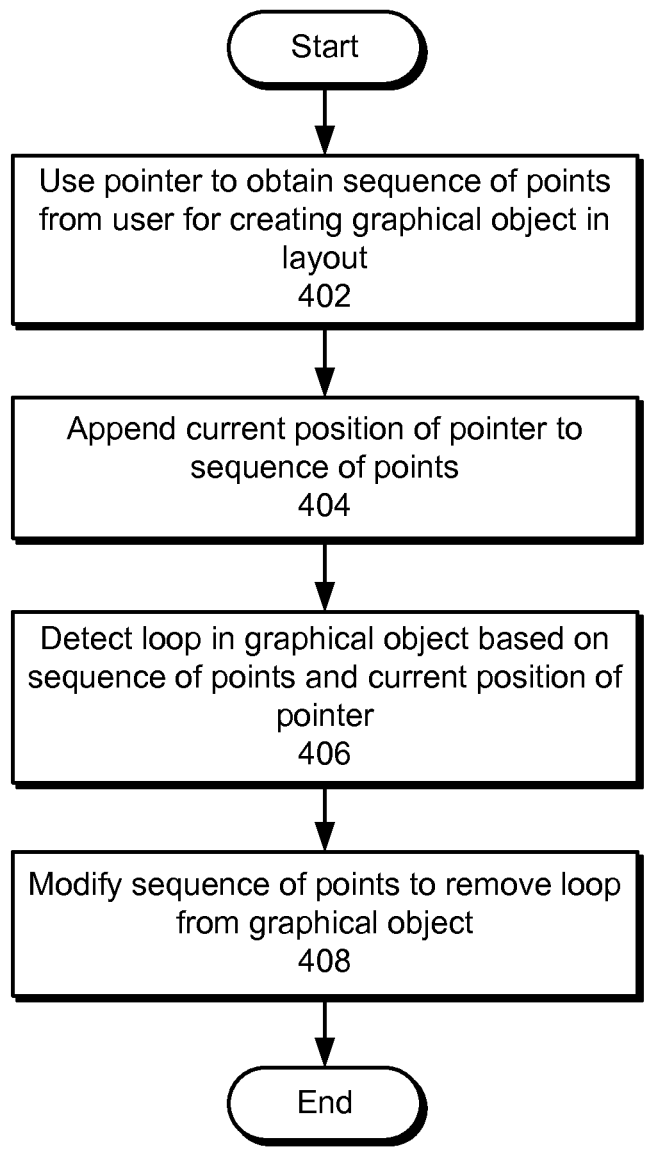
FIG. 4 shows a flowchart illustrating the process of facilitating graphical object creation in an EDA application in accordance with an embodiment.

FIG. 4 shows a flowchart illustrating the process of facilitating graphical object creation in an EDA application in accordance with an embodiment. In one or more embodiments, one or more of the steps may be omitted, repeated, and/or performed in a different order. Accordingly, the specific arrangement of steps shown in FIG. 4 should not be construed as limiting the scope of the embodiments.

Initially, a cursor is used to obtain a sequence of points from a user for creating a graphical object in a layout (operation 402). The graphical object may be associated with a path or polygon in the layout; a path may represent a wire in an integrated circuit, while a polygon may represent an element in the integrated circuit. The cursor may be provided by a GUI associated with the EDA application. Next, the current position of the cursor is appended to the sequence of points (operation 404).

A loop in the graphical object is then detected based on the sequence of points and the appended current position of the cursor (operation 406). The loop may be formed by the intersection of two or more line segments in the graphical object. For example, the loop may be created if the line segment between the last point in the sequence of points and the current position of the cursor intersects an earlier line segment between two consecutive points in the sequence of points. Finally, the sequence of points is modified to remove the loop from the graphical object (operation 408). As mentioned above, the loop may be removed prior to obtaining a new point for inclusion in the sequence of points, or the loop may be removed after the new point is obtained to ensure that the new point does not add the loop to the graphical object.

Figure 5:
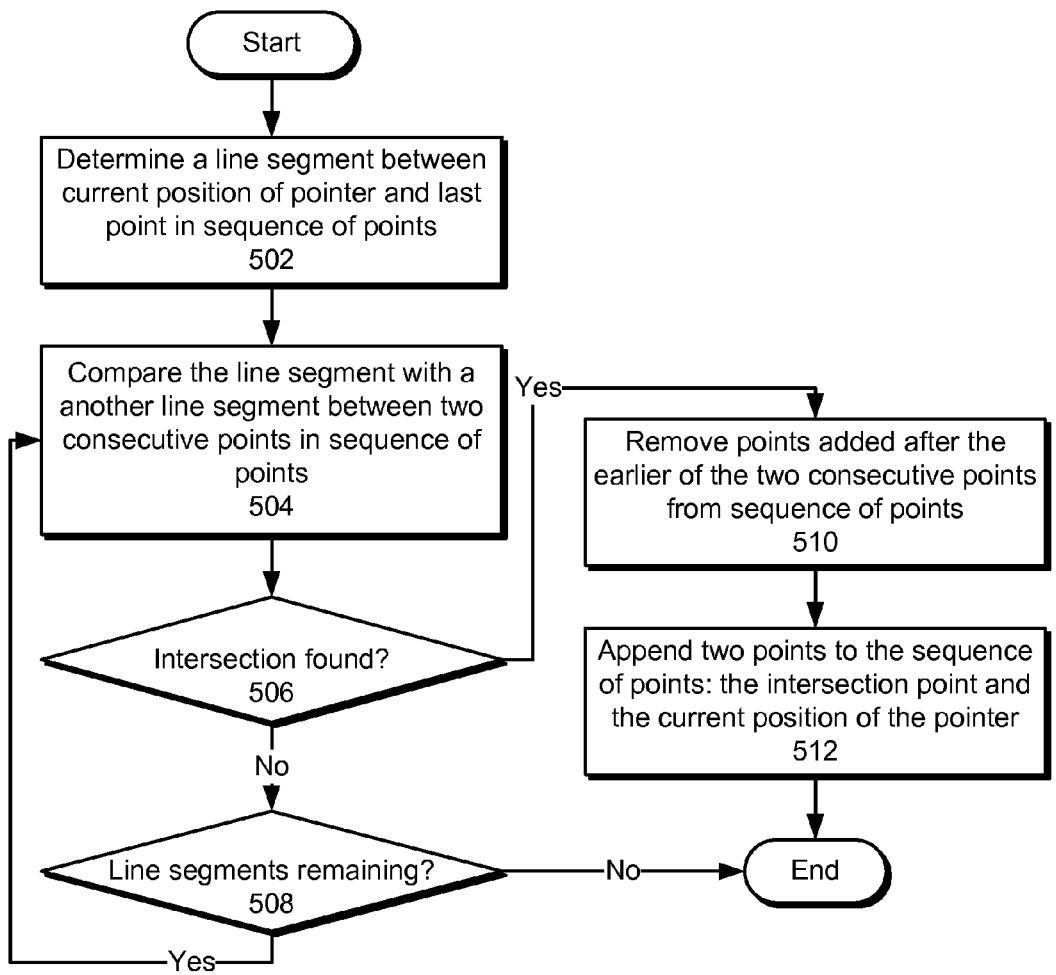
FIG. 5 shows a flowchart illustrating the process of detecting and removing a potential loop in a graphical object in accordance with an embodiment.

FIG. 5 shows a flowchart illustrating the process of detecting and removing a potential loop in a graphical object in accordance with an embodiment. In one or more embodiments, one or more of the steps may be omitted, repeated, and/or performed in a different order. Accordingly, the specific arrangement of steps shown in FIG. 5 should not be construed as limiting the scope of the embodiments.

A cursor may be used to obtain new points for inclusion in the sequence and may inadvertently form a loop in the graphical object. To detect the loop, a line segment between the current position of a cursor and the last point in the sequence of points representing the graphical object is determined (operation 502). Next, the line segment is compared with another line segment between two consecutive points in the sequence of points (operation 504). In particular, the line segment between the current position of a cursor and the last point in the sequence of points may be compared with individual line segments in the graphical object in the order in which the line segments were created.

An intersection may be found (operation 506) between the line segment between the current position of a cursor and the last point in the sequence of points and the line segment between two consecutive points in the sequence of points. If an intersection is found, points added after the earlier of the two consecutive points are removed from the sequence of points (operation 510). In other words, if the two consecutive points in the sequence of points are u followed by v, the points that come after the point u are removed. Next, two points are appended to the sequence of points: the intersection point and the current position of the cursor (operation 512).

However, if no intersection is found, and if there are remaining line segments (operation 508), the remaining line segments may then be compared. Specifically, the line segment formed by the next two consecutive points (operation 504) can then be used to determine whether an intersection exists (operation 506). For example, if point w follows points u and v in the sequence of points, the line segment between points v and w would be the next line segment that would be considered. If an intersection is found, the sequence of points is modified to remove the loop (operations 510-512). If no intersection is found, comparisons may continue until an intersection is found or all line segments defined by the sequence of points have been compared.

Figure 6:
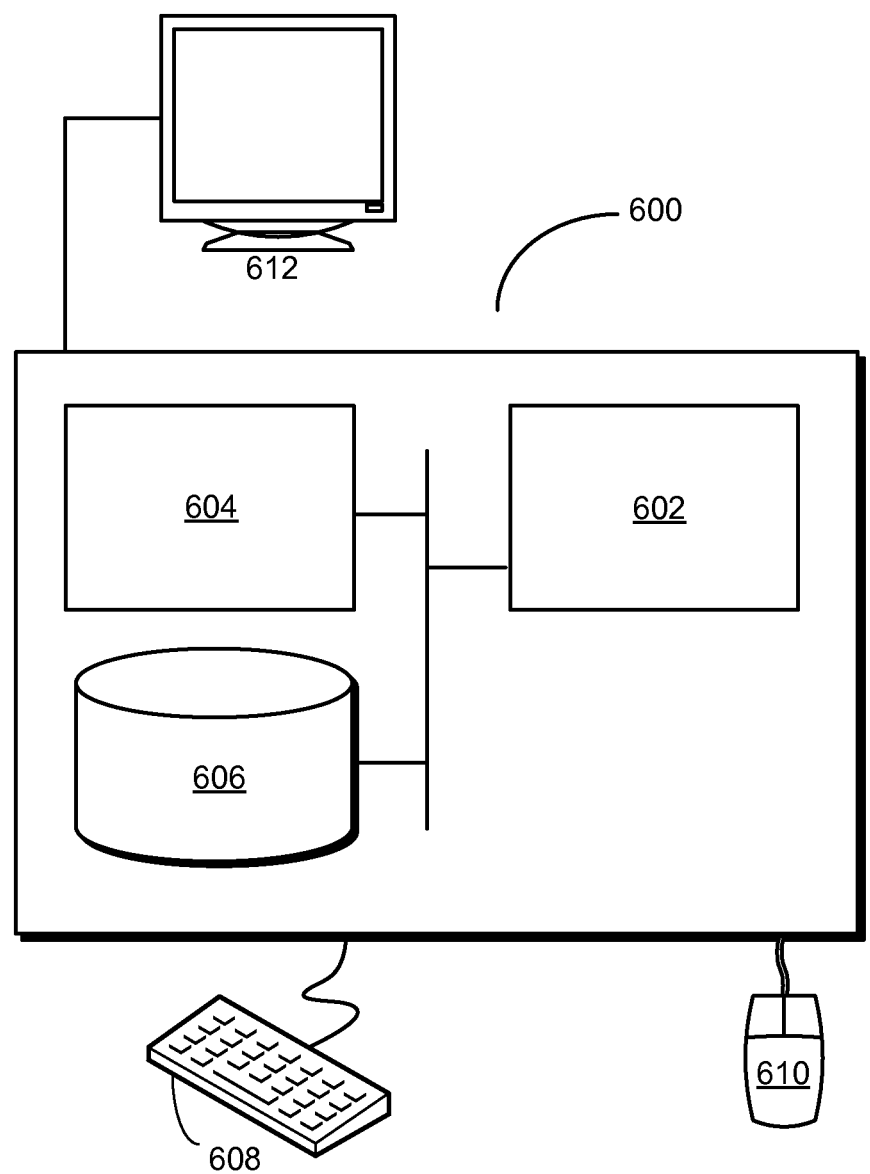
FIG. 6 shows a computer system in accordance with an embodiment.

FIG. 6 shows a computer system 600 in accordance with an embodiment. Computer system 600 includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating the creation of graphical objects in an EDA application. The system may include a GUI that uses a cursor to obtain a sequence of points from a user for creating a graphical object in a layout. The system may also include a loop-detection apparatus that detects a loop in the graphical object based on the sequence of points and a current position of the cursor. Finally, the system may include a loop-removal apparatus that modifies the sequence of points to remove the loop from the graphical object.

In addition, one or more components of computer system 600 may be remotely located and coupled to the other components over a network. Portions of the present embodiments (e.g., GUI, loop-detection apparatus, loop-removal apparatus, etc.) may also be located on different nodes of a distributed system that implements the embodiments. For example, the present embodiments may be implemented using a cloud computing system that enables the creation of layouts on a remote EDA application.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for facilitating graphical object creation in an integrated circuit design layout by using an electronic design automation (EDA) application, comprising:
   obtaining a new point, the new point being a current position of a cursor, for inclusion in a sequence of points to create a graphical object in the integrated circuit design layout;
   determining a last rectilinear line segment between the new point and the last point in the sequence of points;
   examining, in order from the first point in the sequence of points to the last point in the sequence of points, line segments between consecutive points in the sequence of points to detect an intersection with the last rectilinear line segment;
   in response to detecting an intersection between a line segment corresponding to two consecutive points and the last rectilinear line segment,
      removing, from the sequence of points, all points added after the earlier of the two consecutive points, and
      appending the intersection point to the sequence of points;
   appending the new point to the sequence of points; and
   displaying a visual representation of the graphical object using the sequence of points including the intersection point and the new point.

2. The computer-implemented method of claim 1, wherein the graphical object is associated with a path or a polygon.

3. The method of claim 1, wherein prior to detecting an intersection between a line segment corresponding to two consecutive points and the last rectilinear line segment, the method further comprising:
   displaying the visual representation of the graphical object using the sequence of points including the new point.

4. The method of claim 3, wherein after appending the intersection point to the sequence of points, the method further comprising:
   modifying the visual representation of the graphical object by removing a loop created by the intersection between the line segment corresponding to the two consecutive points and the last rectilinear line segment.

5. The method of claim 4, wherein the visual representation is modified prior to obtaining another new point for inclusion in the sequence of points.

6. The method of claim 4, wherein modifying the visual representation includes displaying a line segment from the intersection point to the new point.

7. A system for facilitating graphical object creation in an integrated circuit design layout by using an electronic design automation (EDA) application, comprising:
   a processor; and
   a non-transitory storage medium storing instructions that, when executed by the processor, cause the system to perform a method, the method comprising:
      obtaining a new point, the new point being a current position of a cursor, for inclusion in a sequence of points to create a graphical object in the integrated circuit design layout;
      determining a last rectilinear line segment between the new point and the last point in the sequence of points;
      examining, in order from the first point in the sequence of points to the last point in the sequence of points, line segments between consecutive points in the sequence of points to detect an intersection with the last rectilinear line segment;
      in response to detecting an intersection between a line segment corresponding to two consecutive points and the last rectilinear line segment,
         removing, from the sequence of points, all points added after the earlier of the two consecutive points, and
         appending the intersection point to the sequence of points;
      appending the new point to the sequence of points; and
      displaying a visual representation of the graphical object using the sequence of points including the intersection point and the new point.

8. The system of claim 7, wherein the graphical object is associated with a path or a polygon.

9. The system of claim 7, wherein prior to detecting an intersection between a line segment corresponding to two consecutive points and the last rectilinear line segment, the method further comprising:
   displaying the visual representation of the graphical object using the sequence of points including the new point.

10. The system of claim 9, wherein after appending the intersection point to the sequence of points, the method further comprising:
    modifying the visual representation of the graphical object by removing a loop created by the intersection between the line segment corresponding to the two consecutive points and the last rectilinear line segment.

11. The system of claim 10, wherein the visual representation is modified prior to obtaining another new point for inclusion in the sequence of points.

12. The system of claim 10, wherein modifying the visual representation includes displaying a line segment from the intersection point to the new point.

13. A non-transitory computer-readable storage medium storing instructions that when executed by a computer cause the computer to perform a method for facilitating graphical object creation in an integrated circuit design layout by using an electronic design automation (EDA) application, the method comprising:
   obtaining a new point, the new point being a current position of a cursor, for inclusion in a sequence of points to create a graphical object in the integrated circuit design layout;
   determining a last rectilinear line segment between the new point and the last point in the sequence of points;
   examining, in order from the first point in the sequence of points to the last point in the sequence of points, line segments between consecutive points in the sequence of points to detect an intersection with the last rectilinear line segment;

in response to detecting an intersection between a line segment corresponding to two consecutive points and the last rectilinear line segment, removing, from the sequence of points, all points added after the earlier of the two consecutive points, and appending the intersection point to the sequence of points;

appending the new point to the sequence of points; and displaying a visual representation of the graphical object using the sequence of points including the intersection point and the new point.

14. The computer-readable storage medium of claim 13, wherein the graphical object is associated with a path or a polygon.

15. The computer-readable storage medium of claim 13, wherein prior to detecting an intersection between a line segment corresponding to two consecutive points and the last rectilinear line segment, the method further comprising:

displaying the visual representation of the graphical object using the sequence of points including the new point.

16. The computer-readable storage medium of claim 15, wherein after appending the intersection point to the sequence of points, the method further comprising:

modifying the visual representation of the graphical object by removing a loop created by the intersection between the line segment corresponding to the two consecutive points and the last rectilinear line segment.

17. The computer-readable storage medium of claim 16, wherein the visual representation is modified prior to obtaining another new point for inclusion in the sequence of points.

18. The computer-readable storage medium of claim 16, wherein modifying the visual representation includes displaying a line segment from the intersection point to the new point.

\* \* \* \* \*